Oct. 25, 1966         W. O. FROHLICH         3,280,419
                      DRAIN CLEARING DEVICE
Filed Oct. 15, 1964                          2 Sheets-Sheet 1
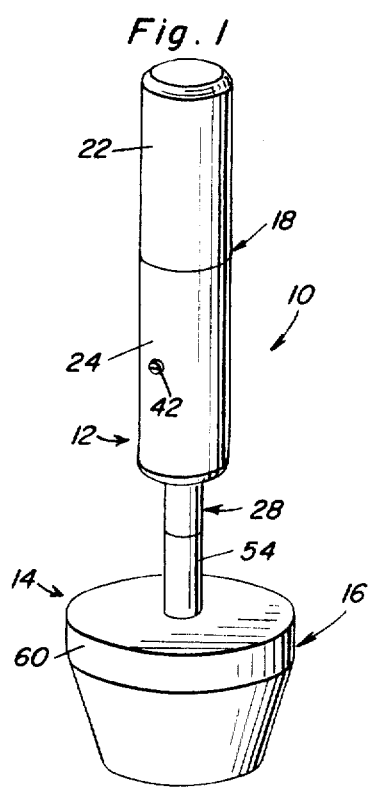
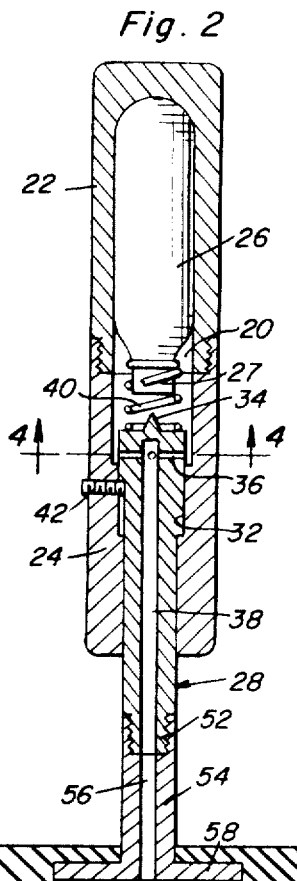
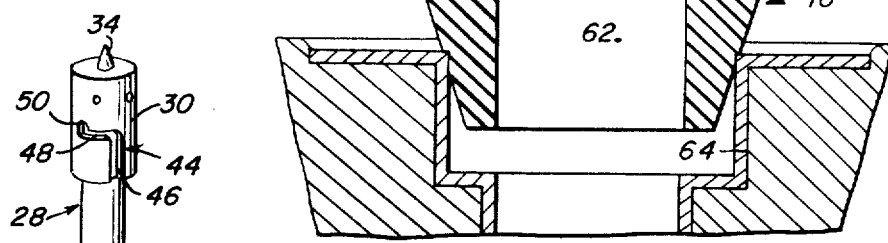
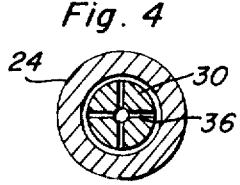
Willy O. Frohlich
INVENTOR
BY Clarence A. O'Brien
and Harvey B. Jackson
Attorneys

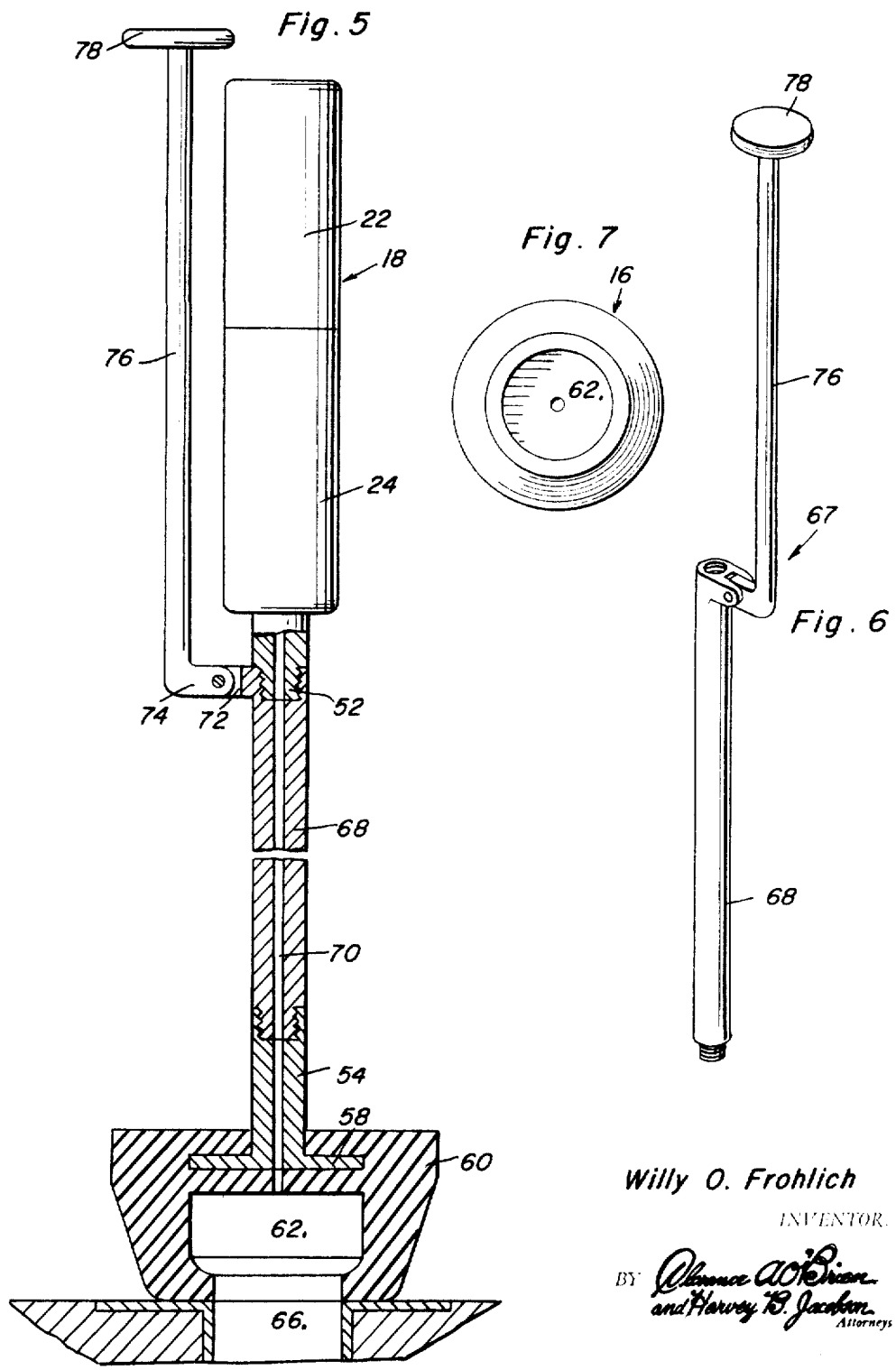

United States Patent Office 3,280,419
Patented Oct. 25, 1966

3,280,419
DRAIN CLEARING DEVICE
Willy O. Frohlich, 447 Nemoral Road, Warminster, Pa.
Filed Oct. 15, 1964, Ser. No. 404,104
6 Claims. (Cl. 15—406)

The present invention is generally concerned with the provision of a hand held pressurized gas implement, and is more specifically concerned with the provision of such an implement which, in conjunction with a uniquely constructed working head provides a highly effective drain clearing device.

One of the primary objects of the instant invention is to provide a conveniently held implement capable of interchangeably receiving carbon dioxide cylinders or flasks and capable of being simply manipulated so as to effect a directional release of the pressurized gas.

In conjunction with the above object, it is also a highly significant object of the instant invention to provide a pliable or resilient reinforced cup-like sealing member for use in conjunction with the basic implement so as to adapt the implement to a wide range of conventional drains whereby the force of the discharging gas can be utlized to effect a clearing of any blockage thereof.

Further, it is an object of the instant invention to provide a safety lock in conjunction with the implement whereby accidental release of the gas is prevented, while at the same time maintaining the implement ready for immediate use as needed.

In addition, it is a significant object of the instant invention to provide that the sealing member be in the form of a removable working head whereby various other types of working heads can be substituted therefor as needed, for example, various types of adapters so as to enable use of the pressurized gas in inflating automobile tires, life rafts, etc.

Also, it is an object of the instant invention to provide a removable extension which is utilized when it becomes necessary to clear difficult to get at drains, such as for example in toilet bowls or where flooding has occurred.

In regard to the clearing of clogged drains, a significant feature of the instant invention is the fact that the sealing head or cup-like member is specifically formed so as to prevent any accidental lateral blow-out of the gas or clogging material such as would occur with the normally flared head provided on conventional manual plungers.

Furthermore, it is an object of the instant invention to provide a unique though relatively simple device which can be economically manufactured and which provides an efficient tool for the home-owner replacing the more conventionally used plungers and plumber's snakes.

Basically, in order to achieve the above objects, the device of the instant invention includes an elongated cylindrical handle defining a hollow cylindrical flask receiving chamber therein. The handle is formed in two releasably interconnected sections so as to allow for an insertion of the flask. Communicating with the interior of the chamber through one end thereof is a hollow shank having means on one end thereof so as to pierce the frangible end of the carbon dioxide cylinder and effect a discharge of the pressurized gas, this shank being mounted for limited longitudinal movement into and out of engagement with the frangible end of the flask, while at the same time incorporating a locking feature whereby movement of the shank can be prevented. Upon perforation of the frangible end of the flask, the gas is discharged into the chamber and through the hollow shank to the working head which, in the preferred form of the invention, consists of a pliable rubber or plastic drain sealing plug. The plug includes a hollow interior opening forwardly and a forwardly converging conically tapered outer surface which enables it to be snugly received within larger drains or, in conjunction with smaller drains, have the outer circular edge thereof curled inwardly entirely thereabout, thereby effectively preventing any tendency for blow-out to occur. Finally, so as to assist in the utilization of the device, a removable extension is provided, this extension consisting of an elongated tubular section which is engaged between the handle mounted shank and the removable working head, and an elongated shaft engaged therewith and laterally offset thereto so as to generally parallel the handle of the implement itself.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the device of the instant invention including the hand pressurized gas implement and the drain sealing pliable cup-like working head;

FIGURE 2 is an enlarged vertical cross-sectional view through the device of FIGURE 1 illustrating the manner in which the sealing head is sealingly received within larger drains;

FIGURE 3 is a perspective view of the shank portion of the implement;

FIGURE 4 is a cross-sectional view taken substantially on a plane along the line 4—4 in FIGURE 2;

FIGURE 5 is an elevational view, with a portion thereof in section, illustrating the auxiliary extension on the device, with the head accommodating a smaller drain;

FIGURE 6 is a perspective view of the extension; and

FIGURE 7 is a bottom plan view of the sealing cup.

Referring now more specifically to the drawings, reference numeral 10 is used to generally designate the device comprising the instant invention with reference numeral 12 designating the hand pressurized gas implement portion thereof and 14 designating the working head which is releasably attached to the implement. As will be appreciated, the preferred form of working head 14, illustrated in the drawings, consists of a pliable rubber or plastic drain sealing cup-like member 16.

The implement 12 includes an elongated cylindrical handle 18 defining an internal elongated cylindrical chamber 20. The handle 18 itself is formed of a pair of threadedly interconnected sections 22 and 24, the rear or upper section 22 receiving the carbon dioxide or pressurized gas cylinder or flask 26 snugly therein with the frangible end 27 thereof directed downwardly. An elongated shank 28 is communicated longitudinally with the chamber 20 through the lower end of the lower section 24 and is both slidably and rotatably mounted therein. The inner end of the shank 28 includes an integral cylindrically enlarged portion 30 which is received within a recessed socket 32, the socket providing a shoulder so as to limit downward movement of the shank 28 while allowing upward movement thereof into the interior of the chamber 20.

The upper end of the shank 28 is provided with a centrally located piercing projection or point 34 which, upon engagement with the frangible head 27 of the flask 26, effects a piercing thereof so as to release the pressurized gas. The gas, upon being discharged from the flask 26 enters the chamber 20 and passes through radially arranged gas passages in the cylindrical enlargement 30 into a longitudinal discharge bore 38 for discharge from the lower or forward end of the shank 28. It will be noted that an expanded compression coil spring 40 is provided within the chamber 20 with one end thereof engaged about the frangible head end 27 of the flask 26 and with the other end thereof engaged with the rear or upper end of the cylindrical enlargement 30 about the piercing point 34, thereby resiliently maintaining the piercing point 34 out of contact with the frangible end of the flask 26 until an actual release of the gas is desired, this release of the gas being effected by merely the exertion of a downward pressure on the handle 18 sufficient to overcome the force of the spring 40.

In addition, in order to prevent an accidential release of the pressurized gas, a safety lock is provided, this lock being in the form of an elongated lug 42 threaded through the lower handle portion 24 and laterally into the socket 32 for reception within a guide channel 44 in the cylindrical enlargement 30, this guide channel including a longitudinally extending portion 46 and a laterally directed portion 48 terminating in an offset 50. In this manner, as will be appreciated, the longitudinal portion 46 must be aligned with the lug 42 if longitudinal movement of the shank is to be effected. When it is desired to lock the shank out of engagement with the flask 26, the lateral portion 48 is aligned with the lug 42 and the shank 28 is rotated so as to orientate the lug in the offset portiton 50, it being contemplated that the spring 40 be sufficient so as to automatically maintain the lug 42 in the offset 50. In this manner, a positive means is provided for preventing accidental release of the gas, while at the same time allowing for a release of the gas through a simple rotation of the handle 18 relative to the shank 28. Incidentally, inasmuch as the lug 42 is threaded in the lower portion 24, it will be appreciated that, if so desired, a permanent locking of the shank 28 in its inoperative position can be effected by merely a tightening of the lug 42, this possibly being desired when storing the implement 12 for long periods of time or during trips.

The lower or forward end of the shank 28 terminates in a diametrically reduced externally threaded nipple 52 which is threadedly received within the internally threaded end of the tubular mounting rod 54 of the working head 14. This rod 54 having a cylindrical exterior thereof which forms a smooth continuation of the shank 28, and also includes an internal passage 56 which is of the same diameter as and forms a longitudinal continuation of the shank passage 38 so as to allow for a smooth discharge of the gas therethrough to and through the resilient drain seal 16. The lower or forward end of the rod 54 includes an enlarged integral circular disc or flange 58 which is embedded within the flat disclike rear or upper portion 60 of the seal 16 so as to permanently mount the drain seal 16 on the attaching or mounting rod 54, and at the same time provide for a rigidifying of the seal.

The seal 16 itself is provided with an enlarged downwardly or forwardly opening cylindrical chamber 62 with which the gas discharge passages 38 and 26 communicate coaxially. The exterior of the sealing head 16, below the disc-like portion 60, is forwardly or downwardly conically tapered and terminates in a truncated forward or lower end. This particular shape is deemed highly significant in that it enables a safe adaptation of the sealing head 16 to both large and small drains without any danger of blow-out. For example, with reference to FIGURE 2, it will be noted that the conical head is received within an enlarged drain 64 and sealed peripherally thereto in a manner whereby no lateral blow-out of the pressurized gas or debris within the clogged drain can occur. By the same token, with reference to FIGURE 5, it will be noted that, in conjunction with small drains 66, the circular lower edge of the sealing head 16 engages about the drain 66 and, through the conical shape thereof, curls inwardly peripherally thereabout, thereby also providing an effective means for preventing any tendency for the pressurized gas to blow out laterally. By way of contrast, attention is directed to the sealing head on conventional drain clearing devices such as manual plungers wherein the seal diverges downwardly as compared to the converging of the instant seal, and as such, causes an outward stretching of the lower edge upon the application of pressure which results in very little resistance to any possible lateral blow-out of debris or pressurized gas if the use of such is contemplated. In fact, this lateral blow-out of air is required if a conventional manual plunger is to operate properly.

With reference to FIGURES 5 and 6 it will be noted that an extension or attachment has been illustrated therein, this attachment, generally referred to by reference numeral 67, includes an elongated tubular extension portion 68 which is threadedly received between the projecting shank 28 and the mounting rod 54 and includes an elongated internal passage 70 of the same cross-section as and in coaxial alignment with the discharge passages 38 and 56. The upper end of the tubular portion 68 includes a pair of laterally projecting parallel ears 72 between which is pivotally mounted the laterally directed end 74 of an elongated shaft 76 which in turn terminates in an enlarged flat handgrip or head 78. Such an attachment will be particularly useful in those drains to which access is not easily attained, such as for example in water closets and under flooded conditions.

In operation, the device 10 is postioned over a drain with the sealing head 16 held, by one hand, into sealing engagement with the drain, this hand either grasping the combined shank and mounting rod or pressing directly on the disc portion of the sealing head. At the same time, the handle 18 is manipulated by the other hand so as to release the safety lock and subsequently pushed down so as to effect a release of the gas within the flask after which the pressure on the handle 18 is released so as to allow the compression spring to move the piercing point of the shank away from the now opened end of the flask 26 for an unincumbered discharge of the gas. In those instances where normal access cannot be had to the drain, an extension is provided whereby sealing pressure can be applied to the sealing head through an elongated handle projecting outwardly generally alongside the main implement handle with the manipulation and release of the gas occurring in the same manner as set forth supra.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A hand pressurized gas implement comprising an elongated handle, an elongated internal chamber within said handle for the reception of a pressurized gas container, an elongated shank projecting slidably through one end of said handle into said chamber, said shank extending longitudinally beyond said one end of the handle and including a gas discharge passage therethrough communicating with the chamber, said shank including a piercing means on the inner end thereof and being capable of limited longitudinal movement inwardly so as to engage the piercing means with the gas container, means for locking the shank against inward movement thereof, a flexible drain sealing member fixed to the outer end of the shank, said member including a forward conically tapered exterior configuration terminating in a truncated forward end, and an enlarged forwardly opening chamber therein, the discharge passage of the shank communicating with the sealing member chamber, a tubular extension removably mounted between the outer end of the shank and the sealing member, said extension including an internal passage forming a continuation of the shank passage, and an auxiliary handle pivotally fixed to the extension and projecting therefrom in laterally spaced relation to the first-mentioned handle.

2. A hand pressurized gas implement comprising an elongated handle, an elongated internal chamber within said handle for the reception of a pressurized gas container, an elongated shank projecting slidably through one end of said handle into said chamber, said shank extending longitudinally beyond said one end of the handle and including a gas discharge passage therethrough communicating with the chamber, said shank including a piercing means on the inner end thereof and being capable of limited longitudinal movement inwardly so as to engage the piercing means with the gas container, means for locking the shank against inward movement thereof, said inner end of the shank being in the form of a cylindrically enlarged portion which prevents withdrawal of the shank through the end of the handle, said enlarged portion including a longitudinal slot therein, a lateral slot in said enlarged portion extending from and communicating with the inner end of the longitudinal slot closest to the extreme inner end of the shank, and a lug fixed to and projecting laterally through the handle and into the longitudinal slot so as to provide for guided longitudinal movement of the shank relative to the handle, said shank being rotatable upon alignment of the lateral slot with the lug with longitudinal movement of the shank being prevented upon introduction of the lug into the lateral slot, thereby constituting the aforementioned locking means.

3. The device of claim 2 including a flexible drain sealing member fixed to the outer end of the shank, said member including a flat circular rear portion and a forward portion extending from said rear portion, said forward portion defining a smooth continuous forwardly tapering conical configuration and terminating in a truncated forward end, an enlarged cylindrically shaped chamber opening forwardly through said truncated forward end, the discharge passage of the shank communicating with the sealing member chamber at the inner end thereof.

4. A pressurized gas implement comprising a handle, an internal chamber within said handle for receiving and holding a pressurized gas container, a shank projecting slidably through one end of said handle into said chamber, said shank extending longitudinally beyond said one end of the handle and including a gas discharge passage therethrough communicating with the chamber, said shank including a piercing means on the inner end thereof and being capable of limited longitudinal movement inwardly so as to engage the piercing means with the gas container, a tubular extension removably mounted on the outer end of the shank, said extension including an internal passage forming a continuation of the shank passage, a flexible drain sealing member mounted on the outer end of the tubular extension, a gas accommodating passage through said sealing member forming a continuation of the extension passage, and an auxiliary handle fixed to the extension and projecting therefrom in laterally spaced relation to the first-mentioned handle.

5. A pressurized gas implement comprising a handle, an internal chamber within said handle for the reception of a pressurized gas container, a shank projecting slidably through one end of said handle into said chamber, said shank extending longitudinally beyond said one end of the hanle and including a gas discharge passage therethrough communicating with the chamber, said shank including a piercing means on the inner end thereof and being capable of limited longitudinal movement inwardly so as to engage the piercing means with the gas container, a flexible drain sealing member fixed to the outer end of the shank, said member including a solid flat circular rear portion, the outer end of said shank including an outwardly directed enlarged flange embedded within the circular rear portion of the sealing member and defining a rigidifying mount for said sealing member, said member, forwardly from the circular rear portion, defining a smooth continuous forwardly tapering conical portion terminating in a truncated forward end, and an enlarged central chamber in said sealing member opening forwardly through said truncated forward end, the discharge passage of the shank communicating centrally with the inner end of the sealing member chamber, said sealing member chamber being cylindrical in shape and having a cross-sectional area substantially greater than that of the discharge passage.

6. A pressurized gas implement comprising a handle, an internal chamber within said handle for the reception of a pressurized gas container, a shank projecting slidably through one end of said handle into said chamber, said shank extending longitudinally beyond said one end of the handle and including a gas discharge passage therethrough communicating with the chamber, piercing means associated with said shank, said shank being capable of limited longitudinal movement inwardly so as to engage the piercing means with the container, the inner end of the shank being in the form of an enlarged portion which prevents withdrawal of the shank through the end of the handle, said enlarged portion including a longitudinal slot therein, a lateral slot in said enlarged portion extending from and communicating with the inner end of the longitudinal slot, and a member fixed to the handle and projecting laterally into the longitudinal slot so as to provide for guided longitudinal movement of the shank relative to the handle, said shank being rotatable upon alignment of the lateral slot with said member with longitudinal movement of the shank being prevented upon introduction of said member into the lateral slot, thereby constituting lock means for selectively locking the shank against inward movement thereof relative to said handle.

References Cited by the Examiner

UNITED STATES PATENTS

| | | | |
|---|---|---|---|
| 1,769,061 | 7/1930 | Hitchock | 15—406 X |
| 1,963,522 | 6/1934 | Gavaza. | |
| 2,981,026 | 4/1961 | Wedrall | 222—5 X |
| 2,999,264 | 9/1961 | Stearns | 15—406 |
| 3,189,934 | 6/1965 | Steinwedel | 15—406 |

ROBERT W. MICHELL, *Primary Examiner.*